United States Patent
Shimomura et al.

(10) Patent No.: US 8,960,838 B2
(45) Date of Patent: Feb. 24, 2015

(54) PRINTER

(71) Applicant: Riso Kagaku Corporation, Tokyo (JP)

(72) Inventors: Kenji Shimomura, Ibaraki (JP); Hiroshi Hayashi, Ibaraki (JP)

(73) Assignee: Riso Kagaku Corporation, Tokyo (JP)

( * ) Notice: Subject to any disclaimer, the term of this patent is extended or adjusted under 35 U.S.C. 154(b) by 0 days.

(21) Appl. No.: 14/280,930

(22) Filed: May 19, 2014

(65) Prior Publication Data

US 2014/0354724 A1 Dec. 4, 2014

(30) Foreign Application Priority Data

May 30, 2013 (JP) .................................. 2013-114000

(51) Int. Cl.
*B41J 2/21* (2006.01)
*B41J 2/07* (2006.01)

(52) U.S. Cl.
CPC ......................................... *B41J 2/07* (2013.01)
USPC .............................................. 347/14; 347/43

(58) Field of Classification Search
CPC ........ B41J 2/1404; B41J 2/2132; B41J 15/04; H04N 5/2628
USPC .................................. 347/5, 14, 15, 19, 40–43
See application file for complete search history.

(56) References Cited

U.S. PATENT DOCUMENTS

| | | | |
|---|---|---|---|
| 6,508,531 B1 * | 1/2003 | Gargir | 347/19 |
| 8,714,692 B1 * | 5/2014 | Metcalfe et al. | 347/19 |
| 2014/0085370 A1 | 3/2014 | ISHIDA | |

FOREIGN PATENT DOCUMENTS

JP          2013-027976          2/2013

* cited by examiner

*Primary Examiner* — Thinh Nguyen
(74) *Attorney, Agent, or Firm* — Greenblum & Bernstein P.L.C.

(57) ABSTRACT

A printer includes a print unit that ejects ink droplets of at least one ink color onto the sheet, at least one roller that feeds the printed sheet, and a controller that controls the print unit to print the sheet based on image data that defines an ink provision amount of each ink color for every dot according to a print resolution. The controller detects, based on the image data, a broad solid area, and carries out a print setting change with respect to the broad solid area by making the print resolution in the image data lower and making the ink provision amount of each ink color in the image data larger according to the print resolution that is made lower. According to the printer, stains on the printed sheet can be restricted.

4 Claims, 7 Drawing Sheets

PRINTER

BACKGROUND OF THE INVENTION

1. Technical Field

The present invention relates to a printer for printing sheets (papers).

2. Background Arts

Inkjet printing is widely prevalent as one of printing methods, in which images are formed by ejecting ink droplets from nozzles of inkjet heads so as to make them landed on a sheet.

An advantage of inkjet printing is that it can form images by simple processes, i.e. ejections of ink droplets onto a sheet (paper) and their permeation into the sheet. However, when printing is done with a plain paper having no coating by an inkjet printer, colors of a printed image may become dull and thereby its print quality may degrade due to ink bleed brought by ink permeability through fibers in the sheet. Against this problem, proposed is ink whose coloring materials remain near a surface of a sheet at permeation of the ink so as to bring good colors.

In addition, printed sheets (papers) may be fed by rollers in many printers including inkjet printers (for example, see Japanese Patent Application Laid-Open No. 2013-27976).

SUMMARY OF THE INVENTION

When feeding printed sheets by a roller(s), a surfaces of the roller contacts with a printed face of a sheet, and thereby coloring materials of ink remained near a surface of the sheet may be transferred to the surface of the roller (first transfer). In addition, the transferred coloring materials may be transferred to another position on the surface of the sheet or a surface of another sheet (second transfer), and thereby the printed sheet may be stained by the second transfer. Especially, in a case where printing is done with ink whose coloring materials remain much near a surface of a sheet, such a stain on the printed sheet may occur easily. In addition, such a stain of the printed sheet may also occur relatively more easily in line-type inkjet printers that carry out high-speed printing and high-speed feeding.

An object of the present invention is to provide a printer that can restrict stains on printed media.

An aspect of the present invention provides a printer comprising: a print unit that prints a sheet by ejecting ink droplets of at least one ink color onto the sheet; at least one roller that feeds the sheet printed in the print unit; and a controller that controls the print unit to print the sheet based on image data that defines an ink provision amount of each ink color for every dot according to a print resolution, wherein the controller detects, based on the image data, a broad solid area that is an area having a size equal-to or more-than a predetermined size to be solidly painted by a single print color to be generated by one or more ink colors and whose ink provision amount per unit area is to be equal-to or more-than a predetermined amount, and carries out a print setting change with respect to the broad solid area by making the print resolution in the image data lower and making the ink provision amount of each ink color in the image data larger according to the print resolution that is made lower.

According to the aspect, by carrying out the print setting change with respect to the broad solid area, coloring materials of ink can be restricted from transferring from the printed sheet to the roller. As a result, it is possible to restrict stains on the printed sheet caused by transferring back of the coloring materials from the roller to the printed sheet.

It is preferable that the controller applies the print setting change only to a partial area in the broad solid area between a trailing line perpendicular to a sheet feed direction and passing over a most-trailing end of the broad solid area along the sheet feed direction and a leading line parallel to the trailing line and set on a leading side from the trailing line along the sheet feed direction by a circumferential length of the roller, and excludes a residual area in the broad solid area other than the partial area from the print setting change.

According to this configuration, while the roller passes over the above partial area to which the print setting change is applied, the coloring materials hardly transfers to the roller. Therefore, it is possible to restrict stains on the printed sheet caused by transferring back of the coloring materials from the roller to the printed sheet, even if the print setting change is not applied to the residual area. In addition, the residual area is printed with an original print setting (i.e. original print resolution and original ink provision amount for every single dot in the image data), so that print quality is maintained. As a result, it is possible to restrict the above-explained stains on the printed sheet while restricting degradation of print quality.

It is preferable that, when the solid broad area doesn't satisfy a condition that a length of the broad solid area along a sheet feed direction is equal-to or more-than a threshold length value and a width of the broad solid area along a direction perpendicular to the sheet feed direction is equal-to or more-than a threshold width value, the controller excludes the broad solid area from the print setting change.

According to this configuration, it is expected that the area that satisfies the above condition won't cause stains on the printed sheet caused by transferring back of the coloring materials from the roller to the printed sheet and won't affect print quality. Therefore, the area that satisfies the above condition is excluded from the print setting change. As a result, it is possible to restrict the above-explained stains on the printed sheet while restricting degradation of print quality by printing the area that satisfies the above condition with an original print setting (i.e. original print resolution and original ink provision amount for every single dot in the image data).

It is preferable that the controller confines target areas for detecting a broad solid area based on the drop data to areas that are to be contacted with the roller after printing of the sheet.

According to this configuration, an area(s) that won't contact with the roller is excluded from the print setting change, even if the area is the broad solid area. However, such an area never causes stains on the printed sheet caused by transferring back of the coloring materials from the roller to the printed sheet. Therefore, it is possible to restrict the above-explained stains on the printed sheet while restricting degradation of print quality by excluding an area that won't cause the stains and won't affect print quality.

DESCRIPTION OF THE EMBODIMENTS

Figure 1:
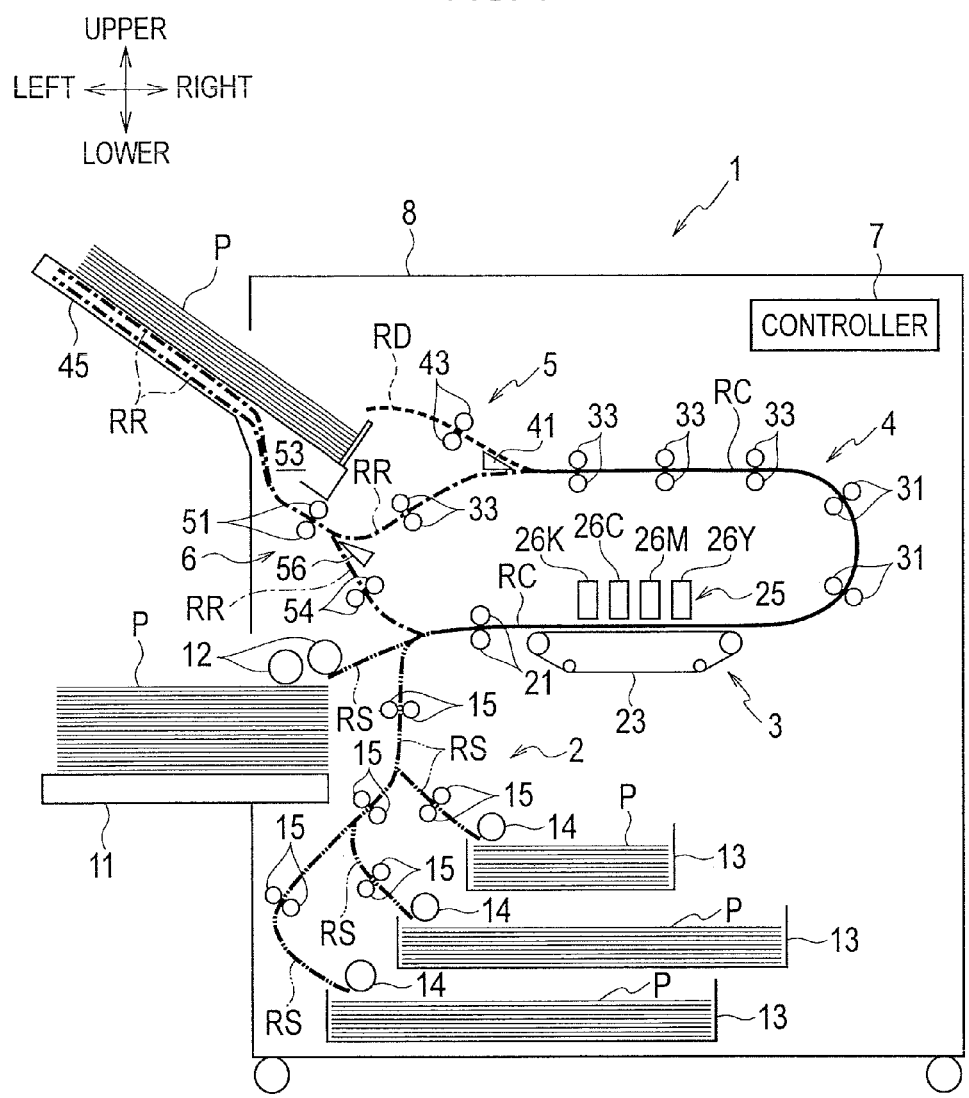
FIG. 1 is a schematic configuration diagram of a printer according to an embodiment.

Hereinafter, an embodiment will be explained with reference to the drawings. In the drawings, an identical or equivalent component is indicated by an identical reference number. Note that the drawings show components schematically, and it should be understood that the components in the drawings are not shown precisely as they are. In addition, actual dimensions of the components and actual dimensional proportions among the components may be shown differently in the drawings.

Further, the embodiment described below is explained as an example that specifically carries out the subject matter of the present invention. In addition, materials, shapes, structures, arrangements of the components are not limited to those in the embodiment. The embodiment may be modified within the scope of the claims (e.g. arrangement of the components may be changed from the embodiment).

In the following explanations, your side with respect to FIG. 1 is denoted as front. A user may operate a printer 1 shown in FIG. 1 from its front side. In addition, upper, lower, left and right are also denoted by viewing from front.

Bold lines shown in FIG. 1 indicate feed paths along which sheets (print media) are fed. Among the feed paths, a normal path RC is indicated by a solid line, a switchback path RR is indicated by a dashed one-dotted line, an ejection path RD is indicated by a dotted line, and sheet supply paths RS are indicated by dashed two-dotted lines. In following explanations, terms "upstream" and "downstream" mean upstream and downstream along the feed paths.

Figure 2:
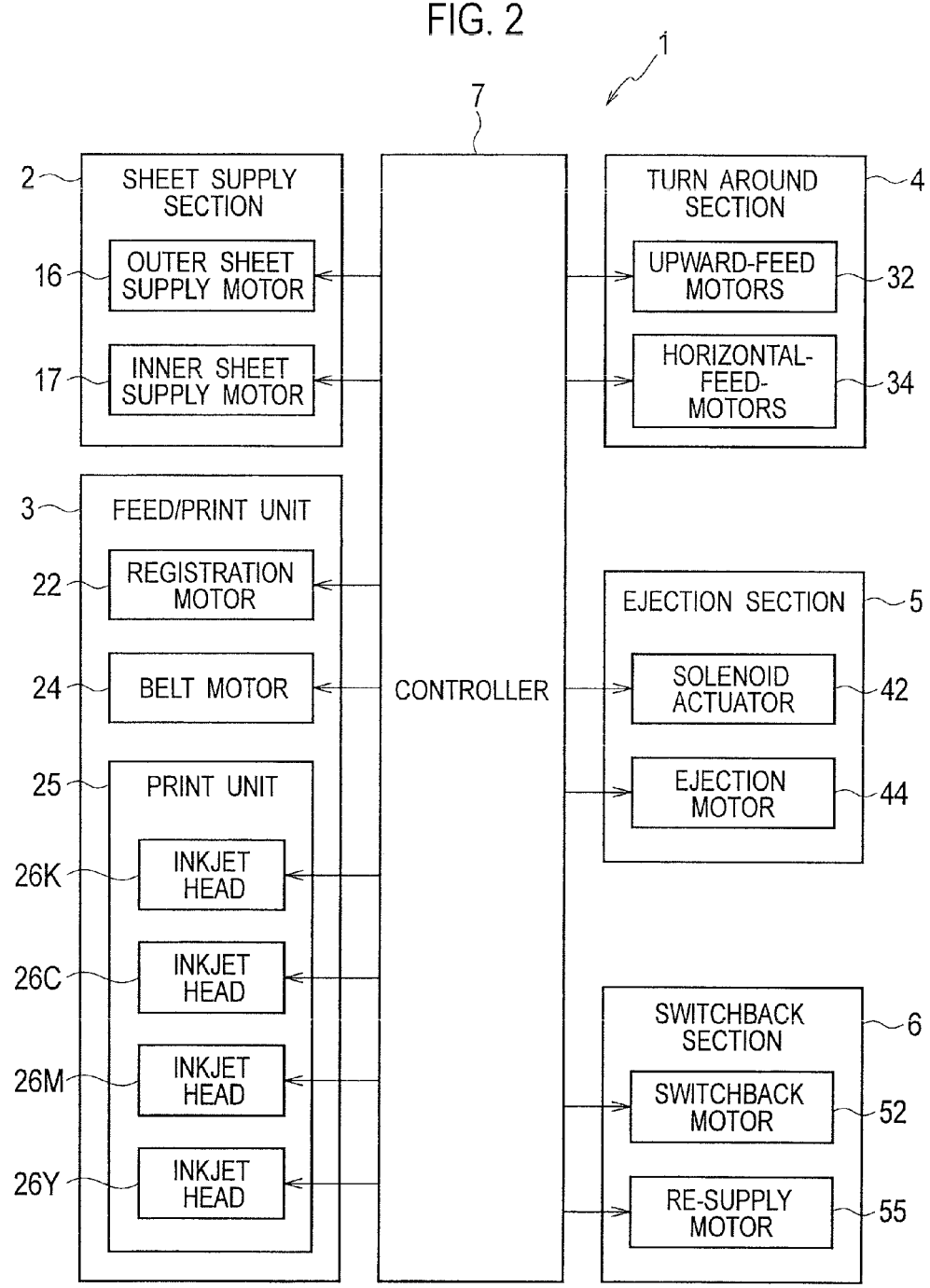
FIG. 2 is a block diagram of the printer.

As shown in FIG. 1 and FIG. 2, the printer 1 according to the present embodiment includes a sheet supply section 2, a feed/print unit (print unit) 3, a turn around section 4, an ejection section 5, a switchback section 6, a controller 7, and a housing 8 that houses and supports the above components.

The sheet supply section 2 supplies sheets P to the feed/print unit 3. The sheet supply section 2 is disposed at the most upstream side along the feed paths. The sheet supply section 2 includes an external sheet supply tray 11, external sheet supply rollers 12, internal sheet supply trays (cassettes) 13, internal sheet supply rollers 14, pairs of upward-feed rollers 15, an outer sheet supply motor 16, and an inner sheet supply motor 17.

On the external sheet supply tray 11, sheets P on which images are to be printed are stacked. The external sheet supply tray 11 is provided in a state where it is partially protruded out from the housing 8.

The external sheet supply rollers 12 pick up sheets P from the external sheet supply tray 11 sheet by sheet, and then feed them sequentially to a pair of registry rollers 21 to be explained later along one of the sheet supply paths RS. The external sheet supply rollers 12 are disposed above the external sheet supply tray 11.

Also on the internal sheet supply trays 13, sheets P on which images are to be printed are stacked. The internal sheet supply trays 13 are disposed within the housing 8.

The internal sheet supply rollers 14 pick up sheets P from the internal sheet supply trays 13 sheet by sheet, respectively, and then feed them sequentially to the sheet supply paths RS, respectively. The internal sheet supply rollers 14 are disposed above the internal sheet supply trays 13, respectively.

The pairs of upward-feed rollers 15 sequentially feed the sheets P picked up from the internal sheet supply trays 13 to the pair of registry rollers 21. The pairs of upward-feed rollers 15 are disposed along the sheet supply paths RS.

The outer sheet supply motor 16 drives the external sheet supply rollers 12 and the most-downstream pair of upward-feed rollers 15 to rotate them. The outer sheet supply motor 16 is coupled with the external sheet supply rollers 12 and the most-downstream pair of upward-feed rollers 15 via one-way clutches (not shown), respectively. Therefore, the external sheet supply rollers 12 are driven by rotations of the outer sheet supply motor 16 in its one rotational direction, and the most-downstream pair of upward-feed rollers 15 is driven by rotations of the outer sheet supply motor 16 in its another rotational direction.

The inner sheet supply motor 17 drives the internal sheet supply rollers 14 and the remaining pairs of upward-feed rollers 15 other than the most-downstream pair of upward-feed rollers 15 to rotate them. The inner sheet supply motor 17 is coupled with the internal sheet supply rollers 14 and the remaining pairs of upward-feed rollers 15 via clutches (not shown), respectively. The clutches can decouple the inner sheet supply motor 17 from the internal sheet supply rollers 14 and the remaining pairs of upward-feed rollers 15 independently from each other. Therefore, the inner sheet supply motor 17 can selectively drive the internal sheet supply rollers 14 and the remaining pairs of upward-feed rollers 15.

The feed/print unit 3 prints images on sheets P while feeding the sheets P. The feed/print unit 3 is disposed downstream from the sheet supply section 2. The feed/print unit 3 includes the pair of registry rollers 21, a belt feed unit 23, a belt motor 24, and a print unit 25.

The pair of registry rollers 21 temporarily stops the sheet P fed from the sheet supply section 2 or the switchback section 6, and then feed it to the belt feed unit 23. The pair of registry rollers 21 is disposed on the normal feed path RC nearby a confluent point of the sheet supply path RS and the switchback path RR. The registry motor 22 drives the pair of registry rollers 21 to rotate it.

The belt feed unit 23 feeds the sheet P fed from the pair of registry rollers 21 while suctioning the sheet P onto its endless platen belt. The belt feed unit 23 is disposed downstream from the pair of registry rollers 21. The belt motor 24 drives the belt feed unit 23 to circulate the platen belt.

The print unit 25 includes inkjet heads 26K, 26C, 26M and 26Y. Note that the inkjet head 26K, 26C, 26M or 26Y may be referred as an inkjet head 26 without its suffix indicating its color (i.e. K, C, M and Y) when it is not needed to discern colors. The print unit 25 ejects ink droplets from its inkjet heads 26 to the sheet P fed by the belt feed unit 23 to print images on the sheet P. The print unit 25 is disposed above the belt feed unit 23.

The inkjet heads 26K, 26C, 26M and 26Y eject black (K), cyan (C), magenta (M) and yellow (Y) ink droplets, respectively. The inkjet heads 26K, 26C, 26M and 26Y are disposed above the belt feed unit 23, and aligned parallel along a right-left direction. Each of the inkjet heads 26 has inkjet nozzles that are aligned along a direction almost perpendicular to a sheet feed direction (i.e. along a front-back direction) with predetermined nozzle pitches. For example, the inkjet heads 26 can be controlled so that each of the inkjet heads 26 ejects ink droplets with one of two print resolutions (e.g. high and low) independently from other inkjet heads 26. In addition, the inkjet heads 26 can be also controlled each of the inkjet heads 26 changes the number of ink droplets (drop number) that are ejected to a dot independently from other inkjet heads 26 to bring different densities by the number of ink droplets. Further, each of the inkjet heads 26 is configured to be able to change a size of a single ink droplet (drop volume) independently from other inkjet heads 26.

The turn around section 4 feeds the sheet P fed from the belt feed unit 23 so as to turn it around from rightward to leftward. The turn around section 4 includes pairs of upward-feed rollers 31, an upward-feed motor 32, pairs of horizontal-feed rollers 33, and a horizontal-feed motor 34.

The pairs of upward-feed rollers 31 feed the sheet P fed from the belt feed unit 23 upward to the pairs of horizontal-feed rollers 33. The pairs of upward-feed rollers 31 are disposed along the normal feed path RC. A segment of the normal feed path RC provided with the pairs of upward-feed rollers 31 is configured to limn a half circle opened on its left side. The upward-feed motor 32 drives the pairs of upward-feed rollers 31 to rotate them.

The pairs of horizontal-feed rollers 33 feed the sheet P fed from the pairs of upward-feed rollers 31 to the ejection section 5 or the switchback section 6. The most-downstream pair of horizontal-feed rollers 33 is disposed in an upstream segment of the switchback path RR. The remaining pairs of horizontal-feed rollers 33 are disposed in a horizontal downstream section of the normal feed path RC. The horizontal-feed motor 34 drives the pairs of horizontal-feed rollers 33 to rotate them.

The ejection section 5 ejects the printed sheets P. The ejection section 5 includes a switching flap 41, a solenoid actuator 42, a pair of ejection rollers 43, an ejection motor 44, and a sheet ejection tray 45.

The switching flap 41 switches over a feed path of the sheets P between the ejection path RD and the switchback path RR. The switching flap 41 is disposed at a branch point of the ejection path RD and the switchback path RR. The ejection path RD is a path extending from a downstream end of the nominal path RC toward the sheet ejection tray 45. The solenoid actuator 42 moves the switching flap 41 to switch over a feed path of the sheets P between the ejection path RD and the switchback path RR. The pair of ejection rollers 43 feeds the sheet P fed onto the ejection path RD by the switching flap 41 to the sheet ejection tray 45 to eject the sheet P. The pair of ejection rollers 43 is disposed between the switching flap 41 and the sheet ejection tray 45 on the ejection path RD. The ejection motor 44 drives the pair of ejection rollers 43 to rotate it.

On the sheet ejection tray 45, the printed sheets P ejected by the pair of ejection rollers 43 are stacked. The sheet ejection tray 45 has a tray shape protruded from the housing 8, and is sloped.

The switchback section 6 turns over a sheet P whose one side has been printed, and then feeds it toward the pair of registry rollers 21. The switchback section 6 includes a pair of switchback rollers 51, a switchback motor 52, a switchback space 53, a pair of re-supply rollers 54, a re-supply motor 55, and a switching gate 56.

The pair of switchback rollers 51 feeds the sheet P fed by the pairs of horizontal-feed rollers 33 of the turn around section 4 into the switchback space 53 temporarily, and then feeds it out from the switchback space 53 to the pair of re-supply rollers 54. The pair of switchback rollers 51 is disposed between the most-downstream pair of horizontal-feed rollers 33 and a feed-in slot of the switchback space 53 on the switchback path RR. The switchback motor 52 drives the pair of switchback rollers 51 to rotate it.

The switchback space 53 is a space for storing the sheet P fed from the pair of switchback rollers 51 temporarily. The switchback space 53 is formed at a lower portion of the sheet ejection tray 45. The opened slot through which the sheet P is inserted into the switchback space 53 is formed nearby the pair of switchback rollers 51.

The pair of re-supply rollers 54 feeds the sheet P fed from the pair of switchback rollers 51 to the pair of registry rollers 21. The pair of re-supply rollers 54 is disposed between the pair of switchback rollers 51 and the pair of registry rollers 21 on the switchback path RR. The re-supply motor 55 drives the pair of re-supply rollers 54 to rotate it.

The switching gate 56 guides the sheet P fed from the most-downstream pair of horizontal-feed rollers 33 toward the pair of switchback rollers 51. In addition, the switching gate 56 also guides the sheet P fed out from the switchback space 53 by the pair of switchback rollers 51 toward the pair of re-supply rollers 54. The switching gate 56 is disposed nearby a centroid of a triangle formed by the most-downstream pair of horizontal-feed rollers 33, the pair of switchback rollers 51, and the pair of re-supply rollers 54 when viewed from front (i.e. in FIG. 1).

The controller 7 controls operations of the components of the printer 1. The controller 7 is configured to include a CPU, a RAM, a ROM, a HDD, and so on.

The controller 7 generates drop data based on input print data when carrying out a print operation. The drop data are image data having a format associated with the inkjet heads 26K, 26C, 26M and 26Y, i.e. data defining the number of ink droplets having a predetermined drop volume to be ejected by of the inkjet heads 26K, 26C, 26M and 26Y. In other words, the drop data are image data defining an ink ejection volume (ink provision amount) for each color for every dot with respect to a predetermined print resolution. The controller 7 drives the inkjet heads 26K, 26C, 26M and 26Y based on the drop data to print the sheet P.

The controller 7 analyzes the drop data to detect a broad solid area(s). The broad solid area is a solid area having a size equal-to or more-than a predetermined size. In addition, a solid area is an area that is solidly painted by a single print color, and an ink ejection volume (ink provision amount) per unit area for a solid area is equal-to or more-than a predetermined volume (amount). A print color of a solid area is a single color made from one or more ink colors. Namely, available print colors include colors made by mixing plural ink colors. When a broad solid area(s) exists, the controller 7 changes a print setting for the broad solid area (print setting change). By the print setting change, with respect to a print resolution and an ink ejection volume defined in the drop data, the print resolution (e.g. dpi: dots per inch) for the broad solid area is made lower than that by an original print setting, and the ink ejection volume for every dot in the broad solid area is made larger than that by the original print setting according to the changed print resolution. An ink ejection volume for a single dot can be calculated by multiplying a size of a single ink droplet (drop volume) by the number of ink droplets (to be) ejected onto the single dot (drop number).

The above print setting change is a process for restricting sheets P from being stained due to a second transfer while being fed. A stain by the second transfer will be explained specifically hereinafter with reference to FIGS. 3A to 4B.

Figure 3A:
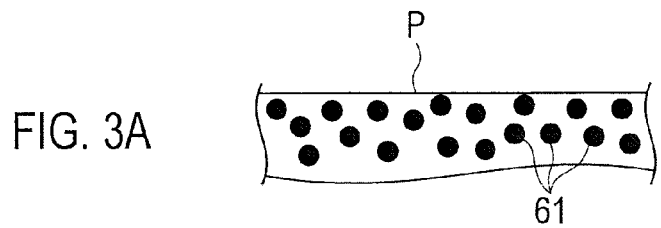
FIGS. 3A to 3C are side views for explaining a first transfer by a roller.
Figure 3B:
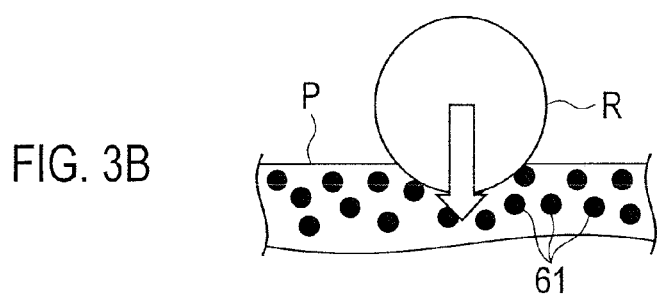
Figure 3C:
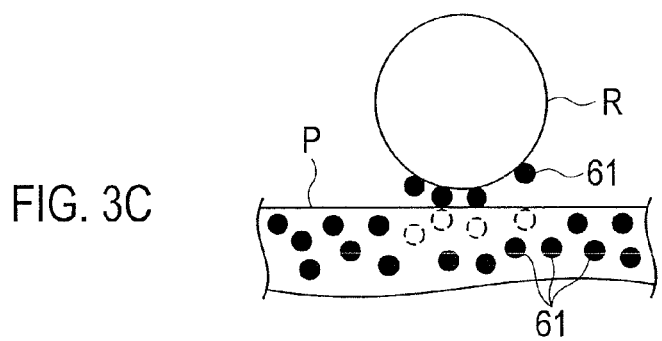

As shown in FIG. 3A, coloring materials 61 exist near a surface of a printed sheet P. While the printed sheet P is fed by a roller(s) R such as the pair(s) of upward-feed rollers 31, the roller R presses the sheet P as shown in FIG. 3B. Due to this pressing, the coloring materials 61 near the surface of the sheet P are attached onto an outer circumferential surface of the roller R as shown in FIG. 3C (the first transfer).

Then, when the roller R on which the coloring materials 61 are attached due to the first transfer presses another position of the sheet P (or, another sheet P), the coloring materials 61 are transferred back to the sheet P from the roller R (the second transfer), and thereby the sheet P is stained by the coloring materials 61 transferred back. This is a stain by the second transfer.

Figure 4A:
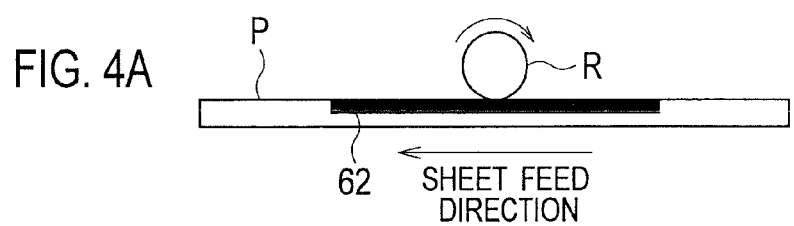
FIGS. 4A and 4B are side views for explaining a second transfer by the roller.
Figure 4B:
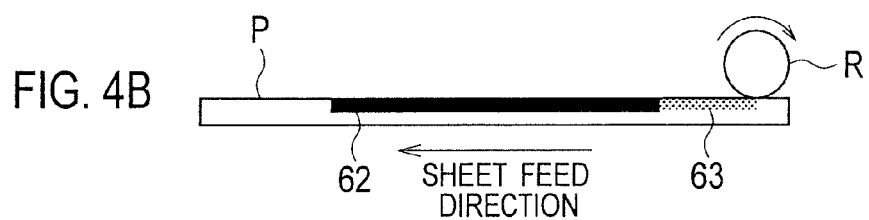
Figure 5:
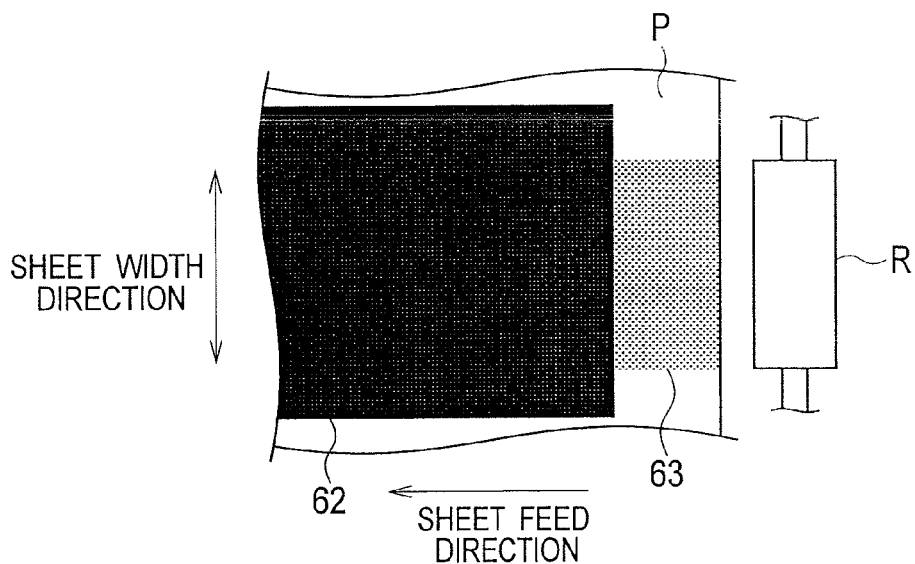
FIG. 5 is a plan view showing stain by the second transfer.

A stain by the second transfer occurs prominently after a roller R passes over a solid area that is relatively broad. As shown in FIG. 4A, while a roller R passes over a solid area 62 that is formed on a sheet P and is relatively broad, many coloring materials 61 are transferred to the roller R. Then, when the roller R passes over a marginal area on a printed face of the sheet P as shown in FIG. 4B, the coloring materials 61 are transferred back to the sheet P and thereby a transferred-back area 63 is made. As a result, the transferred-back area 63 is visible on the marginal area on the printed face of the sheet P as a stain by the second transfer as shown in FIG. 5.

Therefore, the controller 7 carries out the above-explained print setting change with respect to the broad solid area(s) in order to restrict a stain by the second transfer.

Next, operations of the printer 1 will be explained.

Figure 6:
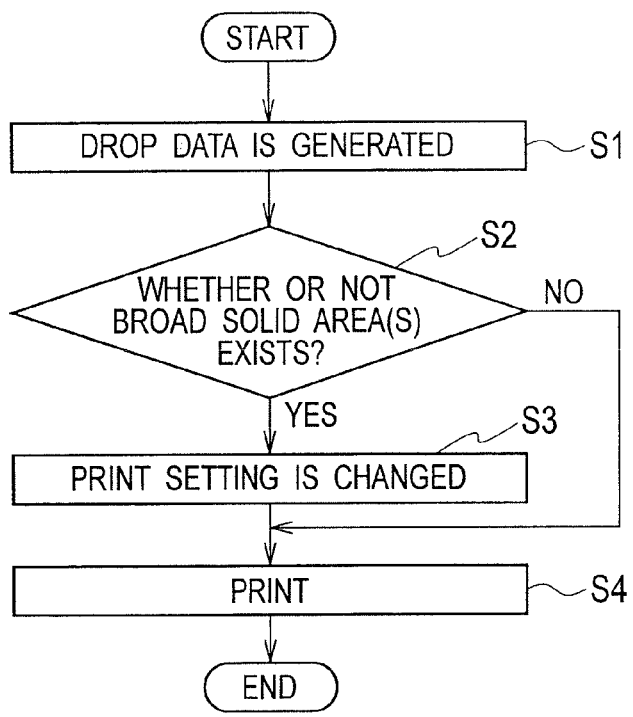
FIG. 6 is a flowchart of operations of the printer.

Processes in a flowchart shown by FIG. 6 are started when the printer 1 receives print data from an external PC (personal computer), for example.

Based on the print data, the controller 7 generates drop data according to a print resolution defined in the print data (step S1). Then, the controller 7 analyzes the drop data to determine whether or not a broad solid area(s) exists (step S2).

When the controller 7 determines that a broad solid area(s) exists (YES in step S2), the controller 7 changes a print setting for the broad solid area (step S3). Specifically, the controller 7 halves a print resolution for the broad solid area, and doubles an ink ejection volume for every single dot revised by the above print resolution change for the broad solid area. The controller 7 doubles the ink ejection volume for every dot by changing at least one of the number of ink droplets (drop number) to be ejected onto said every single dot and a size of an ink ejection volume (drop volume) of a single ink droplet to be ejected onto said every single dot.

Here, the above ink ejection volume change according to the above print resolution change is defined so that imaging performance of the broad solid area after the print setting change becomes equivalent to that by an original print setting. Considering ink bleeds on the sheet P, the above-mentioned ink ejection volume change for doubling an ink ejection volume in the original data can make the imaging performance of the broad solid area after the print setting change equivalent to that by the original print setting. Note that, in view of a difference between ink bleeds on a sheet P "before" and "after" the print setting change, it is enough that the ink ejection volume for every single dot after the print setting change may be made twice to three times larger than that by the original setting in a case where the print resolution is changed from 600 dpi to 300 dpi. Here, the print resolution change for halving the resolution (600 dpi to 300 dpi) makes the number of ink droplets per unit area quarter, but it is not necessary to make the ink ejection volume for every single dot four times larger than that by the original print setting in order to get the equivalent printing performance (as explained above, it is enough to make it twice to three times larger).

Subsequently, the controller 7 carries out printing based on the drop data revised by the print setting change (step S4). On the other hand, when the controller 7 determines that a broad solid area(s) doesn't exist (NO in step S2), the controller 7 carries out printing based on the print data generated in step S1 (the print setting change is not made) (step S4).

When printing is carried out, an unused sheet P is fed out from one of the external sheet supply tray 11 and the internal sheet supply trays 13, and then fed to the feed/print unit 3. In the feed/print unit 3, the sheet P is fed to the belt feed unit 23 by the pair of registry rollers 21.

Then, the sheet P is printed by ink droplets ejected from the inkjet heads 26K, 26C, 26m and 26Y while being fed by the belt feed unit 23. Here, the controller 7 controls the inkjet heads 26K, 26C, 26m and 26Y based on the drop data. If the above-explained print setting change is made, the controller 7 controls the inkjet heads 26K, 26C, 26m and 26Y based on the drop data revised by the print setting change.

The printed sheet P is fed from the belt feed unit 23 to the turn around section 4, and fed forward by the pairs of upward-feed rollers 31 and the pairs of horizontal-feed rollers 33 in the turn around section 4.

In a case of single-side printing, the sheet P whose one side has been printed is introduced to the ejection path RD from the normal path RC by the switching flap 41. Then, the sheet P is ejected onto the sheet ejection tray 45 by the pair of ejection rollers 43.

On the other hand, in a case of duplex printing, the sheet P whose one side has been printed is introduced to the switchback path RR from the normal path RC by the switching flap 41. The sheet P introduced to the switchback path RR is fed to the pair of switchback rollers 51 by the switching gate 56 in the switchback section 6, and then inserted into the switchback space 53 by the pair of switchback rollers 51.

Subsequently, the sheet P is ejected out from the switchback space 53 by the pair of switchback rollers 51, and then fed to the pair of re-supply rollers 54 by the switching gate 56. The sheet P is supplied to the feed/print unit 3 again by the pair of re-supply rollers 54. In the feed/print unit 3, the sheet P is fed to the belt feed unit 23 by the pair of registry rollers 21.

Since the sheet P is turned over by the switchback section 6 to make its unprinted face turned up, the unprinted face of the sheet P is printed by ink droplets ejected from the inkjet heads 26K, 26C, 26m and 26Y while being fed by the belt feed unit 23. Here, the controller 7 controls the inkjet heads 26K, 26C, 26m and 26Y based on the drop data. If the above-explained print setting change is made, the controller 7 controls the inkjet heads 26K, 26C, 26m and 26Y based on the drop data revised by the print setting change.

The sheet P whose both sides have been printed is fed to the ejection section 5 by the turn around section 4, and then ejected onto the sheet ejection tray 45 in the ejection section 5.

Figure 7:
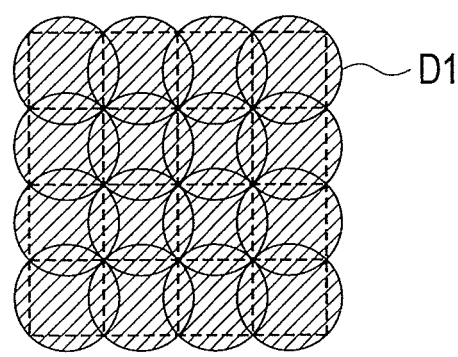
FIG. 7 is a plan view showing ink dots landed on a broad solid area printed without a print setting change.
Figure 8:
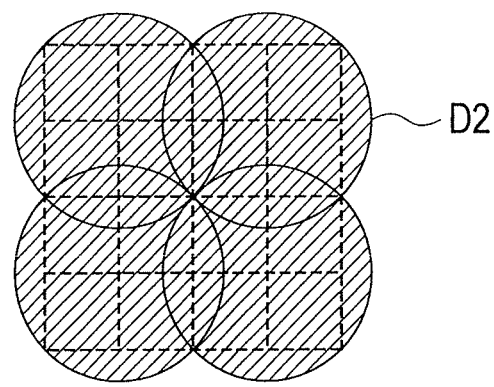
FIG. 8 is a plan view showing ink dots landed on a broad solid area printed with a print setting change.

With respect to the broad solid area printed according to the print setting change, its print resolution is made lower than that in the original drop data but its ink ejection volume for every single dot is made larger than that in the original drop data. For example, if the print setting change is not made, dots D1 for the broad solid area may be formed as shown in FIG. 7. On the other hand, if the print setting change is made, dots D2 for the broad solid area are formed as shown in FIG. 8. In the examples shown by FIGS. 7 and 8, the print resolution is made halved along both lateral and vertical directions, but every dot D2 in FIG. 8 is made by the ink ejection volume twice (to third times) larger than that for every dot D1 in FIG. 7.

Figure 9:
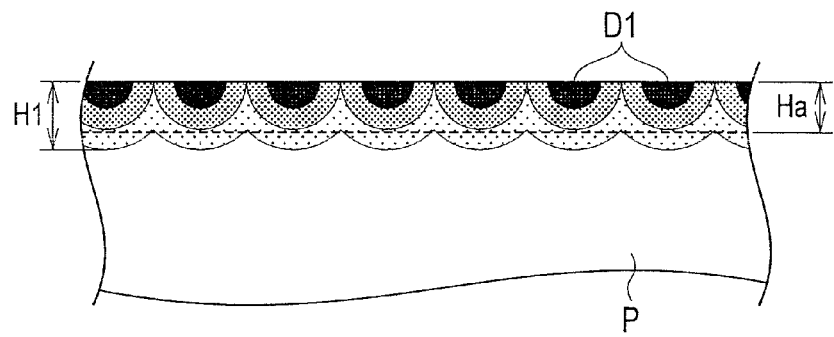
FIG. 9 is an explanatory side view showing ink permeation of the broad solid area printed without a print setting change.
Figure 10:
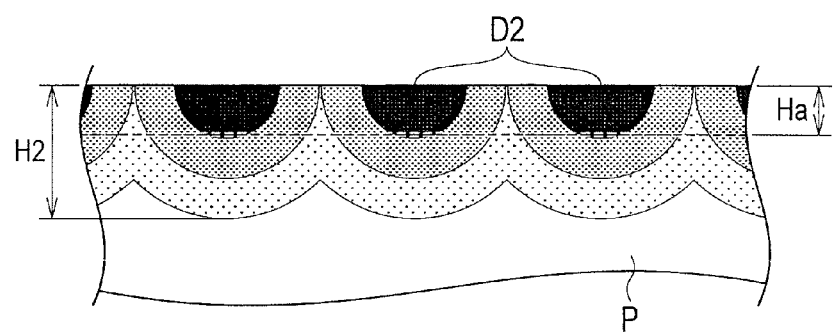
FIG. 10 is an explanatory side view showing ink permeation of the broad solid area printed with a print setting change.

FIG. 9 shows ink permeation of the case shown in FIG. 7, and FIG. 10 shows ink permeation of the case shown in FIG. 8. In FIGS. 9 and 10, the denser indication of an area is, the larger coloring material density in the area is. As shown in FIGS. 9 and 10, generally with normal papers and so on, ink evenly permeates three-dimensionally. Therefore, the more its ink ejection volume for every single dot is, the more deeply the ink permeates from a surface of the sheet P. Namely, an ink permeation depth H2 shown in FIG. 10 is larger than an ink permeation depth H1 shown in FIG. 9. In addition, the more distanced from the center of every dot, the smaller the coloring material density becomes.

Here, the above-explained first transfer that may cause a stain of the second transfer occurs when a roller presses a sheet P. When the roller presses the sheet P, coloring materials existing within a given depth Ha (see FIGS. 9 and 10) from a surface of the sheet P are transferred to the roller. Therefore, the more coloring materials exist near the surface of the sheet P, the more coloring materials are transferred to the roller due to the first transfer. Namely, a stain by the second transfer tends to occur when many coloring materials exist near the surface of the sheet P.

As shown in FIGS. 9 and 10, coloring materials within the depth Ha get involved in the first transfer. Ink shown in FIG. 10 permeates more deeply than ink shown in FIG. 9, so that a total amount of the coloring materials within the depth Ha shown in FIG. 10 is smaller than that shown in FIG. 9. Namely, coloring materials to get involved in the first transfer shown in FIG. 9 remain more in the depth Ha than that shown in FIG. 10.

Therefore, by printing the sheet P after the print setting change as shown in FIG. 10, the coloring materials attached to the roller due to the first transfer can be made less than those by printing the sheet P without the print setting change as shown in FIG. 9.

As explained above, in the printer 1, a print setting change is made for a broad solid area(s) to reduce a print resolution lower than that by an original print setting and to increase an ink ejection volume for every single dot more than that by the original print setting. According to this print setting change, the first transfer of coloring materials from a roller to a printed paper can be restricted. As a result, a stain by the second transfer on the sheet P can be restricted.

With respect to the broad solid area(s), the print resolution is reduced, but the ink ejection volume for every single dot is increased according to the reduced print resolution, so that degradation of print quality can be minimized. With respect to areas other than the broad solid area, coloring materials attached to a roller due to the first transfer are few even without the print setting change. In addition, when printing images with intermediate density, such as text images, other than solid images in the broad solid area by a low print resolution, print quality of the images with intermediate density may degrade significantly. Therefore, in the printer 1, images outside the broad solid area(s) are printed according to the original print setting without the print setting change, so that their print quality can be maintained.

Thus, according to the printer 1 in the present embodiment, stains on printed media due to the second transfer can be restricted while restricting degradation of print quality.

Note that it is possible that the controller 7 applies the print setting change only to a partial area in the broad solid area between a trailing line perpendicular to the sheet feed direction (i.e. parallel to the sheet width direction) and passing over a most-trailing end of the broad solid area along the sheet feed direction and a leading line parallel to the trailing line and set on a leading side from the trailing line along the sheet feed direction by a circumferential length of the roller R, and excludes a residual area in the broad solid area other than the partial area from the print setting change.

Figure 11:
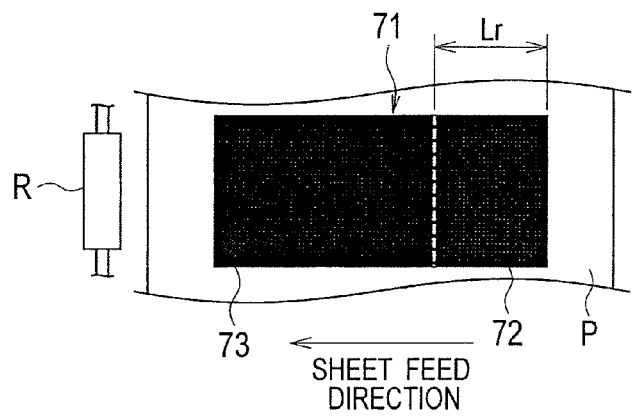
FIG. 11 is a plan view for explaining an example that is exempted from a print setting change.

In this case, as shown in FIG. 11 for example, an partial area 72 from a trailing edge (=trailing line and most-trailing end) in a rectangular broad solid area 71 to a parallel line (=leading line) leading from the trailing edge by a distance Lr is printed with the print setting change. A residual area 73 in the broad solid area 71 other than the partial area 72 is printed without the print setting change. The distance Lr is identical to a circumferential length of a roller R.

Since the area 73 is printed based on an original print setting without the print setting change, its print quality is maintained. While the roller R passes over the area 73, coloring materials are attached to the roller R due to the first transfer. During this process, the second transfer of the coloring materials on the sheet P is made only in the area 73 itself, so that the second transfer hardly affects print quality. In addition, the coloring materials attached to the roller R due to the first transfer in the area 73 are also transferred onto the area 72 due to the second transfer. Since the area 72 is printed as a solid area, the second transfer onto the area 72 hardly affects print quality. In addition, since the area 72 is printed with the print setting change, coloring materials are hardly attached to the roller R due to the first transfer while the roller R passes over the area 72. Therefore, a stain by the second transfer can be restricted while the roller R passes over a trailing side from the trailing edge of the broad solid area. As a result, stains on a printed sheet P due to the second transfer can be restricted while restricting degradation of print quality.

Here, the roller R is a roller for feeding a printed sheet P. In the printer 1, rollers for feeding a printed sheet P are the pairs of upward-feed rollers 31, the pairs of horizontal-feed rollers 33, the pair of ejection rollers 43, the pair of switchback rollers 51, the pair of re-supply rollers 54, and the pair of registry rollers 21. The most-downstream pair of horizontal-feed rollers 33, the pair of switchback rollers 51, the pair of re-supply rollers 54, and the pair of registry rollers 21 feed a paper P whose one side has been printed in duplex printing. Each of these rollers has an identical circumferential length, and the circumferential length is identical to the above-mentioned distance Lr. Note that, in a case where circumferential lengths of these rollers are not made identical to each other, it is enough to define the longest circumferential length among them as the distance Lr.

In addition, when a broad solid area doesn't satisfy a condition that its length L along the sheet feed direction is equal-to or more-than a threshold length value Lth and its width W along a sheet width direction perpendicular to the sheet feed direction is equal-to or more-than a threshold width value Wth, the controller 7 may excludes the broad solid area from the print setting change.

Figure 12:
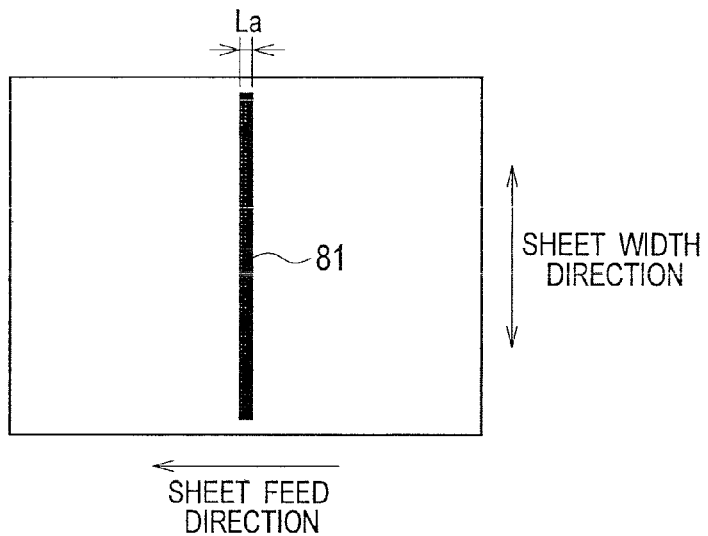
FIG. 12 is a plan view for explaining another example that is exempted from a print setting change.
Figure 13:
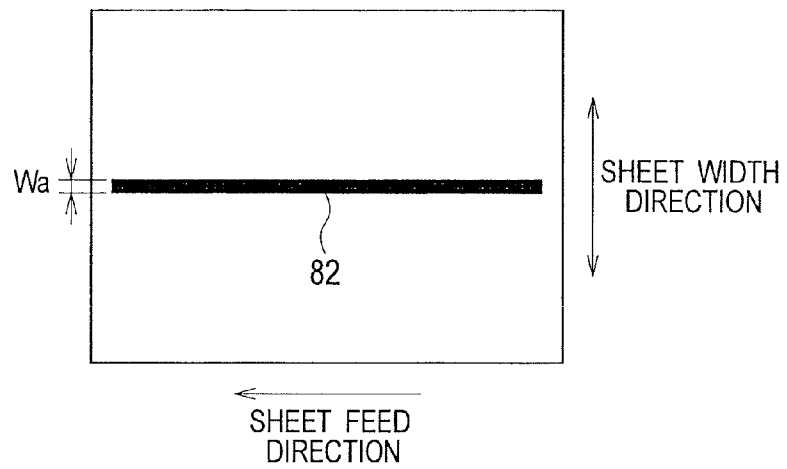
FIG. 13 is a plan view for explaining yet another example that is exempted from a print setting change.

Specifically, a broad solid area 81 shown in FIG. 12 has a length La along the sheet feed direction that is shorter than the threshold length value Lth. On the other hand, a broad solid area 82 shown in FIG. 13 has a width Wa along the sheet width direction that is shorter than the threshold width value Wth. Even when the second transfer is occurred by a long and narrow area such as the areas 82 and 83, a stain by the second transfer becomes hardly visible or becomes indistinctive as a stain.

Therefore, by printing an area(s) that doesn't satisfy the above-mentioned condition and thereby may not cause a distinctive stain by the second transfer, such as the areas 82 and 83, with its original print setting without the print setting change, degradation of print quality while restricting stains on printed media. Note that the threshold values Lth and Wth can be set according to a type of ink, a material of a roller(s), and so on.

Further, the controller 7 may confine target areas for detecting a broad solid area(s) based on the drop data (see step S2 in FIG. 6) to areas that are to be contacted with rollers after printing of the sheet P.

Figure 14:
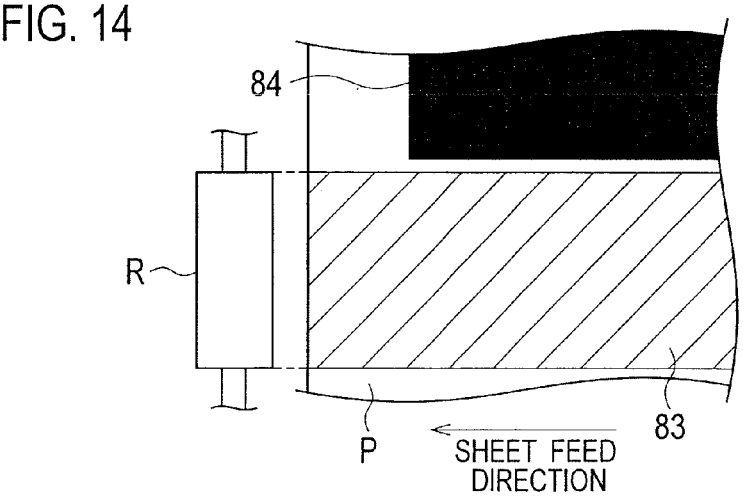
FIG. 14 is a plan view for explaining an example that is exempted from a detection.

As shown in FIG. 14 for example, in a case where a broad solid area 84 exists outside an area 83 that is to be contacted with (pressed by) a roller R, so that the broad solid area 84 never gets involved in a stain by the second transfer. Therefore, by confining the target areas for detection of a broad solid area(s) based on the drop data to areas that are to be contacted with the rollers after printing of the sheet P, the controller 7 can exclude a broad solid area(s) that is to be printed outside the area 83, such as the broad solid area 84, from the target areas for detection of a broad solid area(s) based on the drop data.

As explained above, in the printer 1, rollers for feeding a printed sheet P are the pairs of upward-feed rollers 31, the pairs of horizontal-feed rollers 33, the pair of ejection rollers 43, the pair of switchback rollers 51, the pair of re-supply rollers 54, and the pair of registry rollers 21. All of these rollers are contacted with (press) identical areas on a sheet P that is fed. The controller 7 sets these areas as target areas for detection of a broad solid area(s) in the drop data. Note that, in a case where contacted (pressed) areas are different with respect to every rollers, the controller 7 sets a sum of all areas to be contacted (pressed) by at least any one roller as a target area(s) for detection of a broad solid area(s) in the drop data.

The present invention is not limited to the above-mentioned embodiment, and it is possible to embody the present invention by modifying its components in a range that does not depart from the scope thereof. Further, it is possible to form various kinds of inventions by appropriately combining a plurality of components disclosed in the above-mentioned embodiment. For example, it may be possible to omit several components from all of the components shown in the above-mentioned embodiment.

The present application claims the benefit of a priority under 35 U.S.C. §119 to Japanese Patent Application No. 2013-114000, filed on May 30, 2013, the entire content of which is incorporated herein by reference.

What is claimed is:

1. A printer comprising:
a print unit that prints a sheet by ejecting ink droplets of at least one ink color onto the sheet;
at least one roller that feeds the sheet printed in the print unit; and
a controller that controls the print unit to print the sheet based on image data that defines an ink provision amount of each ink color for every dot according to a print resolution, wherein
the controller detects, based on the image data, a broad solid area that is an area having a size equal-to or more-than a predetermined size to be solidly painted by a single print color to be generated by one or more ink colors and whose ink provision amount per unit area is to be equal-to or more-than a predetermined amount, and carries out a print setting change with respect to the broad solid area by making the print resolution in the image data lower and making the ink provision amount of each ink color in the image data larger according to the print resolution that is made lower.

2. The printer according to claim 1, wherein
the controller applies the print setting change only to a partial area in the broad solid area between a trailing line perpendicular to a sheet feed direction and passing over a most-trailing end of the broad solid area along the sheet feed direction and a leading line parallel to the trailing line and set on a leading side from the trailing line along the sheet feed direction by a circumferential length of the roller, and excludes a residual area in the broad solid area other than the partial area from the print setting change.

3. The printer according to claim 1, wherein,
when the solid broad area doesn't satisfy a condition that a length of the broad solid area along a sheet feed direction is equal-to or more-than a threshold length value and a width of the broad solid area along a direction perpendicular to the sheet feed direction is equal-to or more-than a threshold width value, the controller excludes the broad solid area from the print setting change.

4. The printer according to claim 1, wherein,
the controller confines target areas for detecting a broad solid area based on the drop data to areas that are to be contacted with the roller after printing of the sheet.

* * * * *